United States Patent

[11] 3,633,368

[72] Inventor Iver T. Rosenlund
Kennett Square, Pa.
[21] Appl. No. 63,101
[22] Filed Aug. 12, 1970
[45] Patented Jan. 11, 1972
[73] Assignee E. I. du Pont de Nemours and Company
Wilmington, Del.

[54] EXHAUST GAS REACTOR
16 Claims, 5 Drawing Figs.

[52] U.S. Cl............................................. 60/29 A,
23/277 C
[51] Int. Cl............................................. F01n 3/10
[50] Field of Search...........................60/29 A, 30 R
23/277 C

[56] References Cited
UNITED STATES PATENTS
3,302,394 2/1967 Pahnke............................ 60/30 R
3,413,803 12/1968 Rosenlund....................... 60/29 A
3,486,326 12/1969 Hermes............................ 60/30 R

*Primary Examiner*—Douglas Hart
*Attorney*—John R. Powell

ABSTRACT: An exhaust gas reactor structured as a group of three concentric tubes surrounding two annuli, an inner annulus between the innermost tube and the middle tube and an outer annulus between the middle and outer tubes, the innermost tube, into which exhaust gases enter, having peripheral openings to the inner annulus, the middle tube being open at its ends and provided with a bypass hole, and the exterior tube being insulated and open only at a gas outlet, all arranged to provide a path of flow which is predominantly from the interior tube through the two annuli in series and out the outlet of the exterior tube when the gas flow rate is relatively high, and a shorter path from the interior tube through the two annuli via the bypass hole to the outlet which predominates when the gas flow rate is relatively low.

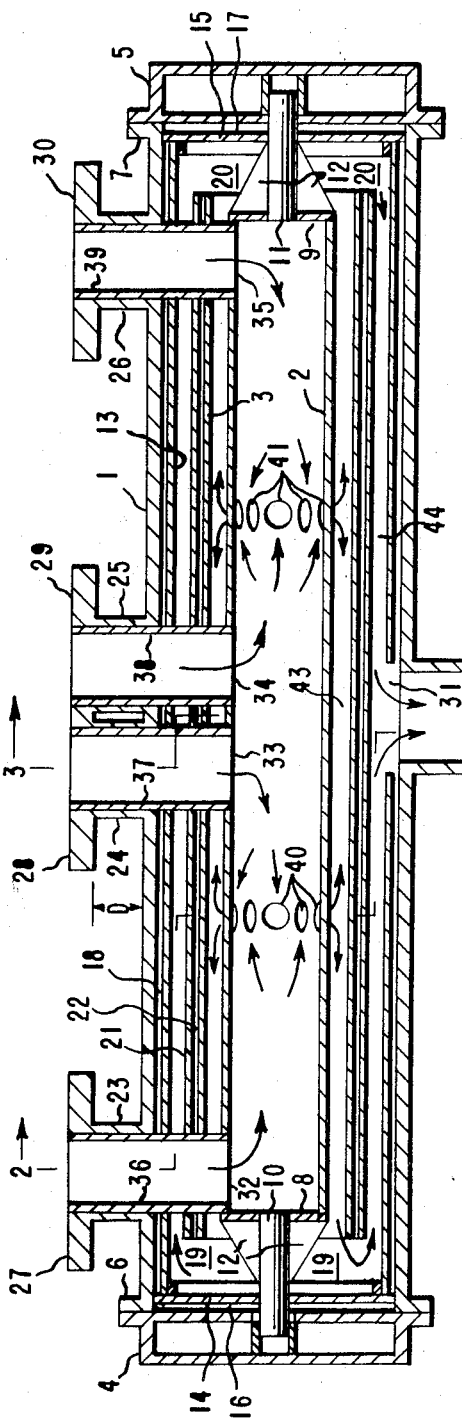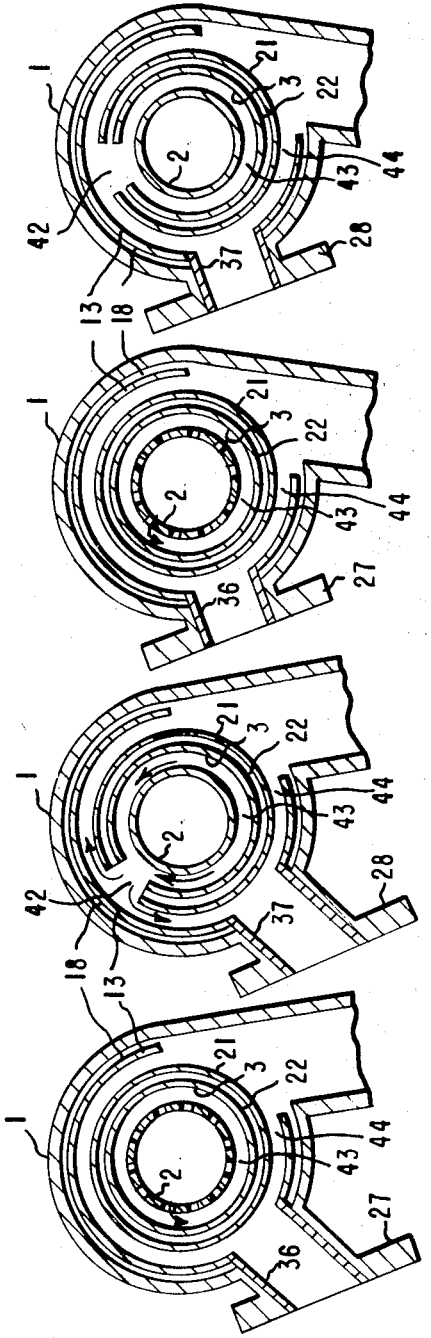
INVENTOR
IVER T. ROSENLUND
BY John R. Powell
ATTORNEY

EXHAUST GAS REACTOR

BACKGROUND OF THE INVENTION

1. Field of the Invention

This invention relates to an improved reactor for reducing air pollutants in engine exhaust gases, and more particularly is directed to a reactor structured to permit alternative predominant paths of flow for exhaust gases of high flow rate and exhaust gases of low flow rate, permitting good reduction in hydrocarbon and carbon monoxide concentrations at economically attractive fuel:air ratios for either flow rate.

2. Description of the Prior Art

Thermal exhaust gas reactors are known in the art. In them hot engine exhaust gases which normally contain unburned hydrocarbons and carbon monoxide are mixed with added air and caused to react to produce relatively innocuous products. To reduce hydrocarbons and carbon monoxide content to an acceptably low value, the reactor must keep the reacting gases hot enough to oxidize during the time they pass through the reactor.

The operating temperature of a reactor varies according to the operating conditions of the engine it serves. When an engine operates an automobile to rapidly accelerate, to pull heavy loads, or to move at high speeds, there is a relatively high flow rate of gases through an exhaust gas reactor, and gases flowing through the reactor easily stay hot enough to effectively oxidize their hydrocarbon and carbon monoxide content. When an engine operates under idling conditions or to more an automobile under level road cruising condition at speeds below about 50 miles per hour the gases flow through the reactor at a relatively low rate, and heat loss to the materials of construction is relatively high. Under the latter conditions, there is difficulty in keeping the gases hot enough for effective oxidation to occur.

U.S. Pat. No. 3,302,394, describes a circumferential exhaust manifold reactor containing an inner reaction chamber and an outer shell positioned around the inner reaction chamber with a plurality of heat-reflecting shields located between the outer shell and the inner reaction chamber. Exhaust gases pass from the engine into the inner reaction chamber and from the inner chamber through passageways between the heat-reflecting shields indirectly to an exit in the outer shell. The reference discloses several-fold reduction of hydrocarbon and carbon monoxide concentrations in exhaust gases.

U.S. Pat. No. 3,413,803, describes a circumferential exhaust manifold reactor containing an inner reaction chamber and an outer shell positioned concentrically around the inner reaction chamber with a heat-reflecting shield located between the outer shell and the inner reaction chamber. Exhaust gases pass from the engine into the inner reaction chamber and from the inner chamber through a passageway between the heat-reflecting shield and the inner chamber to an exit in the outer shell by both a direct path through and an indirect path around the heat-reflecting shield. This reactor was shown to reduce hydrocarbon and carbon monoxide levels under test stand conditions to a lower value than the reactor of U.S. Pat. No. 3,302,394. However, the reactor of U.S. Pat. No. 3,413,803 attains its best performance when the carburetor is modified to give a richer fuel:air ratio in the idle and intermediate speed ranges. Thus, although an improvement is obtained with this exhaust manifold reactor there is still a need for an exhaust manifold reactor which gives increased reduction in hydrocarbons and carbon monoxide concentrations without the need for enriched engine operating mixtures and the resultant higher-cost engine operation.

Prior art reactors like those above have been structured with a reaction chamber, casing, and heat shield in concentric relation. They are also disclosed to have holes in the heat shield. However, the holes in the heat shield, when drawn in a bypassing position, directly opposite a reactor outlet, are but a few of many holes and the result is a single general flow path of gases through the reactor. These holes are not located or sized so that a varied long or short controlled flow path predominates according to the rate of gas flow through the reactor.

It is an object of this invention to provide an exhaust gas reactor capable of reducing the hydrocarbon and carbon monoxide content to acceptably low levels at high exhaust gas flow rates as well as low exhaust gas flow rates even under lean engine operating conditions.

These and other objects are attained by this invention as described and illustrated hereinafter.

SUMMARY OF THE INVENTION

In summary this invention is directed to an exhaust gas reactor for reducing the concentration of hydrocarbons and carbon monoxide in the exhaust gas from an internal combustion engine which comprises A. a heat insulated elongated casing having
  1. inlet holes, and
  2. an outlet between its extremities, said casing being otherwise closed;
B. a reaction chamber concentrically positioned at the interior of the casing, having
  1. gas inlet holes, and
  2. peripheral openings axially removed from the inlet holes, said reaction chamber being otherwise closed;
C. a deflector tube concentrically positioned between the reaction chamber and the casing
  1. forming an inner annulus between the deflector and the reaction chamber,
  2. forming an outer annulus between the deflector and the casing,
  3. providing open communication at its extremities between the inner and outer annulus,
  4. having holes in alignment with inlet holes in the casing and the reaction chamber, and
  5. provided with at least one bypass hole which is
    a. at a location axially different from that of openings in the reaction chamber, and
    b. positioned away from the outlet of the casing;
D. inlet pipes extending through inlet holes in the casing, deflector tube and reaction chamber in communicating connection with the reaction chamber; the reactor providing a series of communicating openings which extend through the reactor in a path which is through the inlet pipes into the reaction chamber, out of the peripheral openings and into the inner annulus, then to a first continuing path which proceeds axially along the inner annulus, through open communication at the extremities of the deflector and along the outer annulus to the casing outlet, and to a second continuing path which is along the inner annulus to a bypass hole, through the bypass hole into the outer annulus and along the outer annulus to the casing outlet. This arrangement provides a reactor structure in which a bypass hole is so located and sized that a long flow path through the reactor is predominant when reacting gases pass at a relatively high flow rate through the reactor, and a short flow path through the reactor is predominant when reacting gases pass at relatively low flow rate through the reactor. The high composite performance of this reactor results from its capability to maintain hot gas temperatures in the long flow path during high gas flow rates and in the short bypassed flow path during low gas flow rates. Such performance is accomplished without exacting a penalty on engine economy by requiring a rich fuel:air ratio.

BRIEF DESCRIPTION OF THE DRAWINGS

FIG. 1 is an axial cross section of a reactor of this invention, depicting, for clarity, its outlet port opposite the inlet pipes.

FIG. 2 is a sectional view across the reactor of FIG. 1, at line 2—2, depicting a preferred relationship of outlet port and inlet pipes.

FIG. 3 is a sectional view across the reactor of FIG. 1 at line 3—3, depicting the same outlet port to inlet pipes relationship.

FIG. 4 is an alternate section view across the reactor of FIG. 1 at line 2—2 depicting the relationship of outlet port to inlet pipes with a reactor.

FIG. 5 is an alternate sectional view across the reactor of FIG. 1 at line 3—3 depicting the relationship of outlet port to inlet pipes as in FIG. 4.

DESCRIPTION OF THE INVENTION

According to this invention there is provided a reactor for reducing air pollutants in exhaust gases of internal combustion engines.

The reactor of this invention can be arranged to serve one or more cylinders of an internal combustion engine. Exhaust gases containing added air oxidize in a reactor of this invention to produce an exhaust gas which is very low in its content of unburned hydrocarbons and carbon monoxide.

As stated above, this reactor comprises three concentric tubes including a reaction chamber and a concentric casing. Between the reaction chamber and case a concentric deflector provides annuli interior and exterior of the deflector. The reaction chamber, an enclosed structure, has (a) inlet holes in it, in communicating connection with inlet pipes which conduct reacting mixtures from an attached engine; and (b) outlet openings through which reacting mixtures thereafter pass. The casing, an enclosed structure, is provided with inlets for the reactant mixtures and an outlet for reacted mixtures. The deflector, an open end structure inside the casing, provides communication between the annuli around its open ends and through at least one bypass hole in it between its ends.

Referring to FIG. 1, this reactor consists basically of three concentric cylindrical members, casing shell 1, reaction chamber 2 and deflector 3 between the casing shell and reaction chamber. Two annular spaces exist between the reactor core and the casing shell, annular space 43 between chamber 2 and the deflector 3 and annular space 44 between the deflector and the casing shell. These components are closed in by exterior end caps 4 and 5. The end caps are fastened to the reaction chamber at flanges 6 and 7 by suitable means, not shown, such as welds, bolts or clamps. The reaction chamber has two end plates 8 and 9 welded to it to close the ends. Two centrally positioned cylindrical extensions 10 and 11 extend beyond the reaction chamber on its axis, and fit into central holes of the end caps having reserve space to allow for the thermal expansion of the reaction chamber assembly. Triangular gussets 12, welded in place, radiate from extensions 10 and 11 to brace the extensions against axial distortion.

Casing shell 1 has casing liner 13 held in a concentric position by its fit on the circular supports of two dead air space end caps 14 and 15. End caps 14 and 15 are circular plates of snug internal fit in shell 1, each having a circular support welded to it. Dead air space end caps are positioned to create dead air spaces 16 and 17 between them and the corresponding exterior end caps 4 and 5. By their support of casing liner 13 they create dead air space 18 between casing liner 13 and casing shell 1. These end caps can be filled with fibrous insulating material. An exterior vent hole in each cap prevents their deformation by heat generated air pressure.

Deflector 3 extends inside the casing shell only so far as it allows open distances 19 and 20 beyond it to dead air space end caps 14 and 15. It is concentrically spaced internally from the reaction chamber by bent metal spacers, not shown, attached around the periphery of reaction chamber 1. Liner 21 encloses deflector 3 coextensively with the deflector at a spaced distance from it. The spaced distance from it is dead air space 22, maintained by interposed spacing material, not shown, attached to deflector 3 and liner 21.

Casing liner 13, deflector 3 and liner 21 are made of material, such as type 310 stainless steel, capable of reducing radiation heat loss.

Casing shell 1 is provided with a row of round mounting sleeves 23, 24, 25 and 26, integral with the shell and terminating in mounting flanges 27, 28, 29 and 30 integral with the sleeves. These flanges are attachable to a bank of engine exhaust ports. The dimension D of the sleeves may vary according to the design of a bank of engine exhaust ports. The inside diameter of these sleeves gradually increases from the mounting flange to where the sleeves join the casing shell.

Casing shell 1 and casing liner 13 have outlet hole 31 through them. In this embodiment the outlet hole is located at the midpoint of the casing shell and circumferentially less than 180° away from the row of mounting sleeves.

Reaction chamber 2 is also provided with inlet holes 32, 33, 34 and 35, arranged in a row and radially aligned with the mounting sleeves. Holes are also provided through deflector 3 and liner 21 in alignment with the reaction chamber inlet holes.

Four inlet pipes 36, 37, 38 and 39 are fitted through the mounting sleeves and corresponding holes in the casing liner, deflector liner and deflector and into the reaction chamber. They fit tightly in the reaction chamber but loosely enough between the reactor core and the mounting flange to allow for thermal expansion sidewise along the reaction chamber. Each inlet pipe is secured to a mounting sleeve by means not shown which can be a through-bolt, a rivet, a snap-fit dimple or other fixing means.

Two rings of chamber outlet holes 40 and 41, equally spaced radially, are also provided in the reaction chamber. Another important opening inside the reactor is bypass hole 42, shown in the sectional view of FIG. 3, passing through deflector 3 and liner 21 at their midpoint and in a position remote from outlet hole 31. The bypass hole shown in the preferred embodiment of FIG. 3 is 170° away from outlet hole 31.

The inlet mounting sleeves of this embodiment set the reactor aside so that it does not interfere with spark plugs in existing engines. Where the spark plugs do not interfere the variation of FIGS. 4 and 5 is another preferred embodiment. In FIGS. 4 and 5 the dimension D of FIG. 1 is at a minimum. Better reactor performance is achieved by the close coupling of FIGS. 4 and 5 because heat loss in the mounting sleeves is reduced.

FIG. 2 shows a sectional view of the reactor of FIG. 1 taken across the line 2—2 with inlet pipe 36 and outlet port 31 in a preferred arrangement.

The concentric tubes of this reactor can be circular, square, oval, rectangular, ell-shaped or any cross-sectional shape adapted to serve an engine in an available space.

The reactor chamber where initial reaction occurs in the reactor is the central tube. It has one or more inlet holes through which all reacting gases are introduced. The inlet hole or holes are located in the periphery or on one or both ends of the reaction chamber. The preferred location of the inlet holes is in the periphery. The reaction chamber is sufficiently long to allow hydrocarbon and carbon monoxide components of exhaust gases to react with the added air and thereby significantly reduce their concentrations. Its inside diameter should be in the range between 1 and 3 inches but preferably should be in the range from 1¾ to 2¾ inches.

Peripheral openings are provided in the reaction chamber through which the gas mixture can exit. These openings should be removed from the positions on the reactor axis where inlet holes exist. The openings may be slots or holes. The total area of such openings should be in the range of 0.25 to 4.0 square inches, preferably 0.7 to 2.5 square inches per 100 cubic inches displacement (CID) served. A preferred array of these openings is an one or more peripheral rings of slots or holes. For a reactor serving more than one cylinder it is preferred that a ring of circular openings be positioned along the reactor axis between adjacent inlet ports.

The casing has passages in it for inlet pipes and for the reactor outlet and is otherwise closed. It is insulated against radiant heat loss to contain reactor heat.

The casing shell is provided at its ends with exterior end caps. These end caps confine the reacting gases inside the casing during passage through the reactor.

Both the casing shell and the exterior end caps are provided with insulating spaces on their inner sides. These spaces are provided by liners of heat-resistant material which resists the passage of radiant heat. Preferably the liner material also reflects radiant heat. The insulating spaces can be dead air spaces through which no reaction mixture is intended to flow. The thickness of the insulating spaces in the shell and ends should be at least 0.020 inches. Preferably it should be at least 0.050 inches. The spaces are limited in maximum size only by practical space considerations of the reactor design. Some advantage is gained by creating more than one concentric insulating space liner just inside the reactor casing.

The exhaust outlet can be located anywhere between the axial extremities of the reactor shell.

A deflector of material resistant to radiant heat loss is the intermediate tube of this structure. Preferably the material is radiant heat reflective. The deflector provides an inner annulus between itself and the reaction chamber, and an outer annulus between itself and the casing. At the extremities of the deflector, there is communicating space between the inner annulus and the outer annulus. There is at least one peripheral opening in the deflector, functionally defined as a bypass hole. This hole is axially located away from the peripheral openings of the reaction chamber and is positioned away from the reactor outlet.

The deflector of this reactor provides an extension of the flow path of reacting mixtures and aids the maintenance of high reaction temperatures of the reacting gas mixtures over the whole path. The deflector can have an insulating liner around it. The hot gases passing through the inner annulus tend to retain their high temperature in that part of their flow path. In the outer annulus, the last flow space of the reactor, there is only minor heat loss because the casing shell is insulated and heat lost from the inner annulus is gained in the outer annulus.

Each of the inner annulus and the outer annulus should have enough area across the reactor axis to allow the gas mixture to pass freely through the annulus. This is assured by providing each annulus with an area across the reactor axis which is at least 0.4, preferably at least 1.5 square inches per 100 cubic inches displacement (CID) served.

The deflector tube should have open spaces at its ends to allow free passage of the gas flow from the inner annulus to the outer annulus. The open spaces should be equal to at least the cross-sectional area of the lesser of the two annuli. Such open spaces can be easily provided by end clearances between the deflector tube and the interior ends of the casing. The deflector must have holes in it through which reactor inlets pass when the reactor serves more than two cylinders. Such holes are aligned between the reactor core and the casing. Where the reactor serves only the two cylinders via coaxial inlets at opposite ends of the reactor chamber, no aligning holes in the deflector are needed.

The deflector tube has at least one bypass hole in its periphery. Bypass holes in the deflector must be properly sized and located in the reactor structure to provide the low rate gas flow a shorter path to the reactor outlet than the path through the open ends of the deflector. A properly designed bypass hole or holes, assure that the residence times of gas mixtures in the shorter path is adequate for the reaction to occur between air and the hydrocarbons and carbon monoxide.

The bypass hole or holes are located away from the exhaust outlet of the casing. They are positioned along the reactor axis away from the reaction chamber openings. As a bypass they enable a shorter path for gas flow to the reactor outlet than the path through the open ends of the deflector. Each bypass hole should be no closer than the shortest annular distance 120° away from the reactor outlet. Preferably each bypass hole is 120° to 180° away from the reactor outlet. Where more than one group of peripheral openings is provided in the reaction chamber, it is preferred that a bypass hole be located between adjacent groups.

The number of bypass holes in the reactor depends on the number of cylinders served. Where one to four cylinders are served by a reactor one bypass hole may suffice. Where three to six cylinders are served two bypass holes may be needed.

Bypass holes should have a total area which is 0.1 to 3.0, preferably 0.2 to 1.25 square inches per 100 cubic inches displacement (CID) served.

Inlet pipes extend through the casing into communicating relation with the inlet holes of the reaction chamber. Where necessary these pipes also pass through the deflector. Their connection with the reaction chamber is close fitting. The casing, and when applicable the deflector, have clearances for the inlet pipes only as large as needed to allow for differential heat expansions. A fixed mounting sleeve integral with the casing may surround each inlet pipe and prevent reactor leakage.

This reactor is readily attached to the exhaust ports of an engine already equipped to flow fresh air into the exhaust port of an engine. Where the engine is not so equipped, it is a simple matter to provide the mounting flanges of a reactor with tubes which direct air into engine exhaust ports.

REACTOR OPERATION

Reference to the drawings shows how the reactor reduces emissions of engine exhaust gases. A mixture of hot exhaust gases containing added air is directed via the inlet pipes in an engine-determined sequence through the inlet holes into chamber 2. Advantageously this gas mixture is as hot as possible. To attain a maximum temperature of mixture in the reaction chamber the reactor is as close to the engine as practical, and the reactor is heat insulated. High temperature in the reaction chamber is aided by heat of reaction which occurs there. As pressure develops from reaction and the incoming flow of more reactant mixture, the reactant mixture is forced out rings of chamber outlet holes 40 and 41 into annular space 43.

The reacting mixture follows annular space 43 in two paths: (a) through bypass hole 42 and into annulus 44 and (b) through open distances 19 and 20 beyond the deflector and into annulus 44. At high flow input, route (b) is the dominant flow path. The mixture in annulus 44 retains its high temperature because its heat content is so great compared to heat losses in the annulus. Retention of high temperature is aided by the fact that both walls have low heat loss by radiation and that one wall (the casing liner) has low conductive heat loss. The extended flow distance at high temperature in annulus 44 accommodates high flow rates of reactant mixtures with good conversion during their relatively short residence in the reactor. For both flow paths the reacting mixture thereafter flows through annulus 44 to outlet 31.

At low flow rate input, the reactant mixtures remain in the reactor a longer time. Were the hot gases to flow along the flow path of high flow rate they would remain in the reactor a longer time and their heat loss to the reactor walls and its surroundings would be relatively greater with the result that reaction temperature would be lowered. At the lower temperature reaction of the residual hydrocarbons and carbon monoxide in the exhaust gases with the admixed air would be less complete so that overall a thermal reactor with a fixed flow path would tend to be less effective at low flow rates.

In a reactor of this invention, when reactant gases enter at a low-flow rate the presence of the bypass hole causes the dominant gas flow path to shift to an interior shortened path which reduces heat loss to reactor metals which are encountered along the longer gas flow path, thus conserving reaction heat and reaction rate. Under low flow rates a flow path through the bypass hole becomes the dominant flow path between annulus 43 and annulus 44. The insulating effect of almost static reaction gas mixture at deflector extremities in the reactor causes a higher reaction temperature than would occur at low flow rates if the path of flow were the high-flow gas path. The result is more oxidation of hydrocarbons and carbon monoxide than would occur with a low rate flow in the high-flow path.

This resulting low flow rate performance of the reactor enchances its overall composite performance as shown by the California Cycle Test, described below.

In testing the emissions of an automobile a sequence of vehicle driving conditions has been adopted by the California Motor Vehicle Pollution Control Board which approximates a typical vehicle trip. This sequence involves a series of acceleration, deceleration, idle and cruise modes of operation over a period of about 20 minutes. Hydrocarbon and carbon monoxide concentrations determined under each of the various modes of operation are multiplied by selected weighting factors to obtain a final number which is believed to be related to the amount of carbon monoxide and unburned hydrocarbons emitted into the atmosphere during a typical trip. The vehicle is at ambient conditions at the start of the test. This test procedure is called the Test Procedure for Vehicle Exhaust Emissions, and is known simply as the California Cycle Test. It will be referred to hereinafter as the California Cycle Test.

MATERIALS OF CONSTRUCTION

The outer shell of the reactor of this invention can be made of common materials such as cast iron or ordinary steel. Other parts of the reactor should be made of any opaque heat-resistant material adaptable to high temperature use in an oxidizing environment. The inner reaction chamber, deflector and insulating liners should particularly be made of material which withstands the hot, corrosive and erosive atmospheres created within the reactor. Chromium-nickel steels have excellent durability for this reactor when they contain 18 to 25 percent by weight chromium and 8 to 32 percent by weight nickel. Especially effective are type 310 stainless steel, containing 25 percent chromium and 20 percent nickel and Incoloy 800, containing 20 percent chromium and 32 percent nickel. These materials are especially well suited to serve as radiation heat barriers in the reactor. Also useful are iron-chromium-aluminum steels containing 12 to 18 weight percent chromium and at least one other alloying component selected from 0 to 5.7 percent aluminum and 0 to 3 percent silicon. Exemplifying these steels are alloy OR–1, containing 12% Cr and 3% Al; alloy 18–2–1, containing 18% Cr, 2% Al and 1% Si; alloy 14 Si, containing 14% Cr and 3% Si; alloy 809–2, containing 12.5% Cr and 5.7% Al; and alloy 805–2, containing 13.7% Cr, 2.7% Al and 2.5% Si.

METHOD OF CONSTRUCTION

Reactors of this invention are readily fabricated by conventional techniques of working metal. Components used in these reactors can be fabricated by forging, rolling, casting, grinding or any other means commonly used to provide the desired shapes and strength in use. Suitable metal thicknesses for parts in these reactors will range from 10 to 200 thousandths of an inch, preferably in the range between 25 and 125 thousandths of an inch.

The method of assembling the reactors is not limited to any particular technique or series of operations. Parts can be connected together by welds, rivets, bolts, pins, clips or any other method known. Parts can be held in their desired relative positions by screws, welds, pins, rivets, bolts, spacers, clips, ridges, dimples or other known methods.

The following examples illustrate various embodiments of this invention in greater detail.

EXAMPLE 1

An exhaust gas reactor corresponding to the reactor of FIG. 1 was fabricated as follows.

A casing shell 19 inches long was cut from stainless steel tube 4½ inches in outside diameter and having a wall thickness of 0.120 inch. Four circular inlet holes each 1.502 inches in diameter were made in the shell along a line parallel to the axis of the tube. Two holes had their centers 1.660 inches apart and equidistant from the axial midpoint of the shell. Each of the other holes had its center 6.770 inches farther from axial midpoint than the first two holes. At the midpoint of the shell, circumferentially 55° from the line of the inlet holes, an exhaust opening was made in the shell to accommodate the entry of a 1.90-inch outside diameter outlet pipe. A 1.90-inch outside diameter 304 stainless steel exhaust pipe was fitted in the exhaust opening and metal extending past the inside of the shell was removed. The fitted exhaust pipe was welded in place. A concentric flange radially one-half inch deep and axially three-sixteenths wide wide was welded flush around at each end of the shell.

Four inlet mounting sleeves were made each of 1.500-inch outside diameter stainless steel tube 2½ inches long with a 0.083-inch wall. Each sleeve was shaped at one end so as to be radially insertable in the casing shell until it was just flush with the interior of the chasing shell. Each sleeve also had its interior tapered from one end to the other so that the end to go in the casing shell had 0.20-inch larger inside diameter than the opposite end. Each sleeve was radially inserted until just flush with the interior of the casing shell. Each sleeve also had its interior tapered from one end to the other so that the end to go in the casing shell had 0.20-inch larger inside diameter than the opposite end. Each sleeve was radially inserted until just flush with the casing shell interior and welded in that position. Mounting flanges were welded on the exterior ends of the sleeves.

Two exterior end caps for the casing were made as follows. A circular piece 310 stainless steel 0.1345 inches thick and 5½ inches in diameter was parallel spaced nine-sixteenths inch coaxially from a 4⅜ inch diameter circular stainless steel 310 0.065 inch thick. A stainless steel tube seventeen thirty-seconds inch in inside diameter was centrally welded in fitted central holes of both circular pieces. The tube hole was sealed where the tube fitted the 0.065-inch stock but was open through the 0.1345-inch stock. Fibrous ceramic insulating material was placed in the space formed by the circular pieces and the steel tube. The insulating material was sealed in place by welding a ribbon of stainless steel stock as a cylinder around the 0.065-inch stock and to the 0.1345-inch stock.

The reaction chamber was made from a piece of 310 stainless steel 2¼ inches in outside diameter and having a 0.065-inch wall thickness and cut to 17 inches length. A line of 1.320-inch diameter inlet holes were made in a line parallel to the axis of the tube and spaced from the midpoint like the casing holes. Two rings of chamber outlet holes each ring consisting of eight equally spaced ½-inch diameter holes were made in the tube. The center of each ring was 3.66 inches from the midpoint of the tube. Two type 310 stainless steel chamber end plates each having a central ½-inch hole were welded inside the tube flush with the ends of the tube. Two ½-inch outside diameter round pieces of steel were each welded in a central hole of a chamber end plate, both pieces of steel being in axial alignment. Each piece extended 1⅞ inches beyond the chamber end. Each piece was axially braced for 1 inch of its extension by welded radially positioned triangular gussets. Six equally spaced tabs of type 310 stainless steel were welded on the periphery of the flush with end of the chamber tube. Each tab extended back three-fourth inch from the end while extending radially three-eighth inch from the periphery.

A deflector was made as follows. A primary deflector tube was made of stainless steel type 310 of inside diameter 3.000 inches, 0.036-inch wall thickness and 17 inches in length. A 17 inch long piece of type 310 stainless steel of outside diameter 3.286 inches, wall thickness 0.029 inch was machined to form a series of peripheral grooves and ridges until the grooves just bottomed on the inserted 3-inch tube. This secondary tube so formed and positioned on the primary tube provided a dead air space of five sixty fourths inch average depth. The secondary tube was positioned around the primary tube coextensive with it and with a 5/64-inch steel spacer onefourth inch wide and 1 inch long circumferentially positioned between the tubes across their midpoint. The spacer was spot welded to each tube. From the spot welds towards the ends of the tube assembly four 1.380-inch diameter inlet holes were made through both tubes, spaced as in the casing. A circular 1 inch diameter bypass hole was also drilled at the midpoint of the tube assembly through both tubes, the circumferential location being 115° from the line of the inlet holes.

A double-wall casing liner for the reactor was made as follows. A 19¼-inch section of type 310 stainless steel having an outside diameter of 4.160 inches and a wall 0.030 inch thick was formed. A like length section of type 310 stainless steel having an outside diameter of 4.00 inches and a 0.030-inch wall was formed. One section was fitted coextensively in the other with a type 310 stainless steel spacer ringing the inner section at its midpoint and flush with its ends. The fit was fixed by spot welds. Four inlet holes were made, positioned as in the casing shell. A 2½-inch exhaust hole was made through the liner to correspond with the casing shell.

Each of two dead air space end caps were made as follows. A 4 15/64-inch diameter plate of type 310 stainless steel 0.065 inch thick was made with a central 33/64-inch diameter circular hole. A ½-inch wide strip of type 310 stainless steel 0.065 inch thick was butt welded to the plate in a concentric circle of 3 59/64-inch diameter.

Four inlet pipes were made, each with the following shape. They were of stainless steel tube 1.305-inches outside diameter having a wall 0.060 inch thick and a length of 3 11/16 inches.

The above parts were assembled in the following arrangement.

The casing liner was positioned inside the casing shell, so that its inlet holes corresponded with those in the casing shell. The deflector was positioned inside the casing liner so that its bypass hole was in a location remote from the exhaust outlet of the casing shell when the inlet ports were aligned. In this arrangement, the bypass hole was about 170° away from the exhaust hole. The reaction chamber was positioned inside the deflector.

Each of the above components was coaxially positioned by further elements. The dead air space end caps, fitting snugly inside the casing shell, centrally supported the casing liner. Support of the casing liner created an additional dead air space around it. The central hole in these caps further aligned the round extensions of the reaction chamber. The deflector, closely fitting on the tabs of the reactor core was centralized at the same time.

Components inside the shell were aligned with the shell along its axis by means of the four inlet pipes inserted through the inlet necks and successive components of the reactor until they were tightly fitted in the holes of the reaction chamber. The inserted position of each inlet neck was fixed by a bolt through the inlet pipe and the inlet sleeve that it lined.

The ends of the casing shell were closed at each end by bolting an exterior end cap in coaxial relation to the shell flange. A steel asbestos gasket was used with the end cap. It extended toward the reactor axis enough to space the dead air space end cap away from the end. It also sealed the reactor. The tube hole was additional support for the round extension of the reactor core and provided thermal expansion room for the extension.

EXAMPLE 2

A standard 1967 Chevrolet equipped with a 283-cubic inch displacement V-8 engine outfitted with the air injection system available from the manufacturer for that model year was used in emission tests. Factory standard ignition and carburetors were used.

A. The automobile described above was run on a dynamometer for times and under loads prescribed by the California Cycle Test procedure, and the emissions were recorded.

B. Exhaust reactors of example 1 above, having no bypass hole incorporated in them, were installed on the car in place of the exhaust manifolds. The car was then run on a dynamometer by the California Cycle Test and the emissions were recorded.

C. Exhaust reactors of example 1 above, each having a single ¾-inch diameter circular bypass hole were installed on the car in place of the exhaust manifolds. The car was run on a dynamometer by the California Cycle Test and the emissions were recorded.

D. Exhaust reactors of example 1 above, each having a single 1-inch diameter circular bypass hole were installed in place of the exhaust manifolds of the car. The car was operated on a dynamometer by the California Cycle Test and the emissions were recorded.

E. Exhaust reactors of example 1 above, each having a single 1½-inch diameter circular bypass hole were installed in place of exhaust manifolds of the car. The car was operated on a dynamometer according to the California Cycle Test and the emissions were recorded.

F. Exhaust manifolds of the engine were replaced by exhaust reactors described in example 1 of U.S. Pat. No. 3,413,803. The car was then run on a dynamometer by the California Cycle Test and the emissions were recorded. The composite emission values of the California Cycle Test are reported as parts per million (p.p.m.) by volume of hydrocarbons and as percent by volume of carbon monoxide. Below are the results.

| Exp. | Area in square inches per 100 CID served | | | | California Cycle Test | |
|---|---|---|---|---|---|---|
| | Cannulus | | Peripheral openings | Bypass hole | Hydro-carbons, p.p.m. | CO, percent |
| | Inner | Outer | | | | |
| 2A | | | | | 199 | 1.60 |
| 2B | 2.18 | 2.61 | 2.22 | 0 | 46 | 0.61 |
| 2C | 2.18 | 2.61 | 2.22 | 0.31 | 44 | 0.42 |
| 2D | 2.18 | 2.61 | 2.22 | 0.56 | 39 | 0.36 |
| 2E | 2.18 | 2.61 | 2.22 | 1.25 | 43 | 0.36 |
| 2F | | | | | 184 | 1.32 |

This experiment shows how much the reactors of this invention can reduce engine exhaust emissions. The particular value of a bypass hole in reducing carbon monoxide emissions of engine exhaust gases is also shown.

EXAMPLE 3

A. A 1969 Chevrolet, equipped with a 350-cubic inch V-8 engine having standard ignition and the Controlled Combustion System which were standard that year, was operated on a dynamometer by the California Cycle Test and the emissions were recorded.

B. An air injection pump supplied by Chevrolet for some special car models in 1969 was installed on the above car. In addition, each exhaust manifold was replaced by an exhaust gas reactor made as in example 1 above, provided with a single 1-inch bypass hole and modified so that each exhaust gas reactor was provided with inlets short enough to allow the reactor to be mounted as closely as possible to a row of cylinders. FIGS. 4 and 5 exemplify the reactor. Each reactor mounting flange was provided with an air inlet pipe, extending through the flange into an engine exhaust port. Every air inlet pipe was connected to the air injection pump.

The so modified car was operated on a dynamometer by the California Cycle Test and the emissions were recorded.

Results of the tests were as follows.

| Exp. | Area in square inches per 100 CID served | | | | California Cycle Test | |
|---|---|---|---|---|---|---|
| | Annulus | Annulus | Peripheral openings | Bypass hole | Hydro-carbons, p.p.m. | CO, percent |
| 3A | | | | | 199 | 1.64 |
| 3B | 1.76 | 2.11 | 1.80 | 0.45 | 25 | 0.25 |

The attained low emission values of this example indicate the added merit of locating an exhaust reactor as close as possible to engine exhaust ports.

EXAMPLE 4

A. A standard 1967 Chevrolet automobile provided with a 283-cubic inch V-8 engine fitted with air injection available from the manufacturer for that model year was operated on a 22 mile course in an established mixed city-suburban route and in a 25 mile course in city traffic only. The average distances per gallon of gasoline consumed were noted.

B. Exhaust manifolds of the car in A were replaced by exhaust manifold reactors of example 1 above, provided with a single 1-inch bypass hole. The operating runs of A were repeated and the gasoline mileage per gallon was noted.

C. The same car was fitted with reactors of example 1 of U.S. Pat. No. 3,413,803 in place of exhaust manifolds. The ignition and carburetor were adjusted so that the reactor gave its best emission control performance—that is 50 p.p.m. hydrocarbons and 0.50 percent carbon monoxide by the California Cycle Test. The car was then operated as in A and the gasoline mileage per gallon was noted. Comparative fuel economies in miles per gallon are noted below.

| | Area in square inches per 100 CID served | | | | Miles per gallon | |
|---|---|---|---|---|---|---|
| Exp. | Annulus | Annulus | Peripheral openings | Bypass hole | Mixed city, suburban | City only |
| 4A | | | | | 16.7 | 10.5 |
| | | | | | 16.7 | 10.9 |
| Average | | | | | 16.7 | 10.7 |
| 4B | 2.18 | 2.61 | 2.22 | 0.56 | 15.5 | 10.9 |
| | | | | | 16.2 | 11.4 |
| | | | | | 16.1 | |
| | | | | | 15.8 | |
| Average | | | | | 15.9 | 11.2 |
| 4C | | | | | 14.6 | 10.0 |
| | | | | | 14.6 | 9.7 |
| | | | | | 14.2 | |
| | | | | | 14.5 | |
| Average | | | | | 14.5 | 9.8 |

An exhaust gas reactor of this invention is compatible with other emission control systems such as an exhaust gas recirculating system to control the nitrogen oxides content in exhaust gases. Such a system involves taking off some of the exhaust gases downstream from the gas reactor and metering the takeoff into the carburetor between the venturi section and throttle plate to dilute the fuel:air mixture. The dilution reduces the peak temperature of burning gases in the cylinders, thereby reducing nitrogen oxides in the exhaust gases. Particulate matter carried through an exhaust gas reactor can also be separated from the reactor effluent by separate means downstream of the reactor.

The detailed description of the invention above is given for clearness of understanding only and no unnecessary limitations are to be construed therefrom. The invention is not limited to the exact details shown and described, as obvious modifications will occur to those skilled in the art.

The embodiments of the invention in which an exclusive property or privilege is claimed are defined as follows:

1. An exhaust gas reactor for reducing the concentration of hydrocarbons and carbon monoxide in the exhaust gas from an internal combustion engine comprising
   A. a heat insulated elongated casing having
      1. inlet holes, and
      2. an outlet between its extremities, said casing being otherwise closed;
   B. a reaction chamber concentrically positioned at the interior of the casing, having
      1. gas inlet holes, and
      2. peripheral openings axially removed from the inlet holes, said reaction chamber being otherwise closed;
   C. a deflector tube concentrically positioned between the reaction chamber and the casing
      1. forming an inner annulus between the deflector and the reaction chamber,
      2. forming an outer annulus between the deflector and the casing,
      3. providing open communication at its extremities between the inner and outer annulus,
      4. having holes in alignment with inlet holes in the casing and the reaction chamber, and
      5. provided with at least one bypass hole which is
         a. at a location axially different from that of openings in the reaction chamber, and
         b. positioned away from the outlet of the casing;
   D. inlet pipes extending through inlet holes in the casing, deflector tube and reaction chamber in communicating connection with the reaction chamber; the reactor providing a series of communicating openings which extend through the reactor in a path which is through the inlet pipes into the reaction chamber, out of the peripheral openings and into the inner annulus, then to a first continuing path which proceeds axially along the inner annulus, through open communication at the extremities of the deflector and along the outer annulus to the casing outlet, and to a second continuing path which is along the inner annulus to a bypass hole, through the bypass hole into the outer annulus and along the outer annulus to the casing outlet.

2. The reactor of claim 1 in which the casing, deflector and reaction chamber are cylindrical.

3. The reactor of claim 2 in which the reaction chamber has an inside diameter in the range 1 to 3 inches.

4. The reactor of claim 2 in which the reaction chamber has an inside diameter in the range between 1 and 2¾ inches.

5. The reactor of claim 2 in which each bypass hole is located away from the exhaust outlet by at least the shortest annular distance 120° away from the reactor outlet.

6. The reactor of claim 1 in which each bypass hole is 120° to 180° away from the reactor outlet.

7. The reactor of claim 1 in which each annulus has a cross-sectional area of at least 0.4 square inches per 100 cubic inches of engine displacement served.

8. The reactor of claim 1 in which each annulus has a cross-sectional area of at least 1.5 square inches per 100 cubic inches of engine displacement served.

9. The reactor of claim 1 in which the peripheral openings in the reaction chamber have a total area of 0.25 to 4.0 square inches per 100 cubic inches of engine displacement served.

10. The reactor of claim 1 in which the peripheral openings in the reaction chamber have a total area of 0.7 to 2.5 square inches per 100 cubic inches of engine displacement served.

11. The reactor of claim 1 in which the total area of all bypass holes is between 0.1 and 3.0 square inches per 100 cubic inches of engine displacement served.

12. The reactor of claim 1 in which the total area of all bypass holes is between 0.2 and 1.25 square inches per 100 cubic inches of engine displacement served.

13. The reactor of claim 1 in which the open communication of each extremity of the deflector has at least the cross-sectional area of the lesser of the inner and outer annuli.

14. The reactor of claim 1 in which the casing deflector and reaction chamber are cylindrical, all bypass holes have a total area of 0.1 to 3.0 square inches per 100 cubic inches of cylinder displacement served, and each bypass hole is located away from the exhaust outlet by at least the shortest annular distance 120° away from the reactor outlet.

15. The reactor of claim 1 in which the casing deflector and reaction chamber are cylindrical, the open communication at each end of the deflector has at least the area of cross section of the lesser of the two annuli, each bypass hole is 120° to 180° away from the reactor outlet, and for each 100 cubic inches of engine displacement served each of the inner and outer annuli has a cross-sectional area of at least 1.5 square inches, the peripheral openings have a total area of 0.7 to 2.5 square inches and the total area of the bypass holes is between 0.2 and 1.25 square inches.

16. The reactor of claim 15 in which there are four inlet pipes and one bypass hole.

* * * * *

Dedication 3,633,368.—*Iver T. Rosenlund*, Kennett Square, Pa. EXHAUST GAS RE-
ACTOR. Patent dated Jan. 11, 1972. Dedication filed June 28, 1973,
by the assignee, *E. I. du Pont de Nemours and Company.*
Hereby dedicates to the Public the entire term of said patent.
[*Official Gazette November 6, 1973.*]